United States Patent [19]

Foster et al.

[11] Patent Number: 4,749,739

[45] Date of Patent: Jun. 7, 1988

[54] LOW VISCOSITY HOT-MELT ADHESIVES

[75] Inventors: Bruce W. Foster; Larry W. Hilscher, both of Longview, Tex.

[73] Assignee: Eastman Kodak Company, Rochester, N.Y.

[21] Appl. No.: 934,886

[22] Filed: Nov. 25, 1986

[51] Int. Cl.$^4$ ............................................. C08L 23/00
[52] U.S. Cl. .................................... 524/271; 524/274
[58] Field of Search ............................... 524/271, 274

[56] References Cited

U.S. PATENT DOCUMENTS

| | | | |
|---|---|---|---|
| 3,220,966 | 11/1965 | Flanagan | 524/274 |
| 3,798,118 | 3/1974 | Jones | 524/274 |
| 4,072,735 | 2/1978 | Ardemangi | 524/274 |
| 4,367,113 | 1/1983 | Karm et al. | 524/271 |

Primary Examiner—Joseph L. Schofer
Assistant Examiner—Peter D. Mulcahy
Attorney, Agent, or Firm—John F. Stevens; William P. Heath, Jr.

[57] ABSTRACT

Disclosed is a hot-melt adhesive composition capable of bonding paper to metal, glass and polyethylene terephthalate comprising an amorphous polymer selected from polypropylene or copoly(propylene-butene) having a propylene content of greater than 50%, a hydrocarbon tackifier resin, and a rosin tackifier. Preferably, the composition also contains a polyethylene wax.

4 Claims, No Drawings

LOW VISCOSITY HOT-MELT ADHESIVES

TECHNICAL FIELD

The present invention relates to hot-melt polymeric adhesives having good adhesion to substrates such as glass, metal, polymers, etc. This adhesive is especially useful in bonding labels, tapes and decals of conventional materials such as paper, plastic, etc. to such substrates.

BACKGROUND OF THE INVENTION

Hot-melt adhesives which are useful in such applications as the bonding of labels, tapes and decals to various substrates are well known in the art. Such adhesives are normally specially adapted for use on certain kinds of substrates. At the present time, however, I am unaware of amorphous olefin-based hot-melt adhesives which have the versatility of being useful in bonding to a variety of substrates such as glass, metal and polymers. Also, the hot-melt adhesives according to the present invention have a good balance of high and low temperature bond quality, and the combination of good tack and low viscosity for ease of application. Furthermore, the hot-melt adhesives according to the present inventin have low color, low odor when molten, good thermal stability and less tendency of bleed-through when compared to known conventional hot-melt adhesives.

The adhesives according to this invention are generally applied by a hot-melt applicator which includes a reservoir for the adhesive, heating means for melting the adhesive and maintaining it in a molten state, and means for applying the adhesive for a particular end use.

To be suitable for use on typical hot-melt labeling equipment, the adhesive should have several key characteristics. Among these are low viscosity at typical application temperatures of 150°–180° C., resistance to stringing, aggressive tack, long open time, and good specific adhesion to typical container and label substrates. Other desirable properties are low color and odor, low tendency to bleed through label stock, and good thermal stability. In the past, hot-melt adhesives useful for labeling have been commonly based on ethylene-vinyl acetate copolymers or synthetic block copolymer rubbers which are diluted with rosins, waxes, and plasticizers to yield the desired machining characteristics. Such formulations are generally high in color and odor, and exhibit significant changes in viscosity on exposure to heat for extended periods. While polyolefin-based adhesives exhibit low color and odor, and good thermal stability, those available to date generally lack the tack and adhesion necessary to bond a variety of label stocks to various substrates, and have not been available with the low viscosity necessary for machining on hot-melt labeling lines. Therefore, it would be an advance in the state of the art to provide a polyolefin-based adhesive having the necessary low-melt viscosity, good tack and specific adhesion, and low color and odor to be desirable in bonding or sealing labels, tapes, decals, etc., to provide bonds having good strengths at both low and high temperatures.

One patent of interest is U.S. Pat. No. 4,567,223. This patent discloses a hot-melt adhesive comprising a blend of at least one modified (such as by reaction with an unsaturated polycarboxylic acid) propylene/$C_4$ to $C_{10}$ higher 1-olefin copolymer having an acid number of at least 5, a tackifying resin, and a high density, low viscosity polyethylene wax having a molecular weight of at least about 1000. The present invention differs from the hot-melt adhesive of U.S. Pat. No. 4,567,223 in that the adhesive of the present invention uses an unmodified olefin polymer or copolymer. It further differs from this patent in that both a hydrocarbon tackifier and a rosin tackifier are required. The U.S. Pat. No. 4,567,223 discloses in Example 8 that low density (i.e., 0.925) polyethylene wax is not satisfactory in that invention.

DESCRIPTION OF THE INVENTION

According to the present invention, there are provided hot-melt adhesive compositions useful for bonding paper and other substrates to metal, glass and polyethylene terephthalate comprising (a) about 30–60% by weight of an amorphous polymer selected from polypropylene or copoly(propylene-butene) having a propylene content of greater than 50%, the polymer having a melt viscosity of about 100–2000 cps at 190° C., a density of about 0.8 to 0.9 and a saponification number of about 0 to 5.0, (b) about 10–40% by weight of a saturated, polycyclic hydrocarbon tackifier resin having a Ring and Ball softening point (RBSP) of about 70°–130° C. and a melt viscosity of about 100 to 2000 cps at 190° C., and (c) about 10–35% by weight of rosin tackifier having an acid number of about 130–170 and a RBSP of about 70°–100° C.

Preferably, the hot-melt adhesive composition further contains (d) an amount up to about 20% by weight of a polyethylene wax having a melt viscosity of about 100 to about 200 cps at 125° C. and a RBSP of about 90°–120° C. Such hot-melt adhesive compositions are capable of forming peel strengths between paper and glass, metal or polymer of at least 500 gms/in width. Obviously, the adhesive compositions will total 100 weight % of (a) through (d) plus any minor quantities of conventional additives mentioned hereinafter.

In a preferred embodiment of the present invention, the amorphous polymer is present in an amount of about 45–55% by weight, the hydrocarbon tackifier is present in an amount of about 15–25% by weight, the rosin tackifier is present in an amount of about 15–25% by weight and the polyethylene wax is present in an amount of about 5–15% by weight.

Preferably, the viscosity of the amorphous polymer is about 200–500 cps at 190° C. and the RBSP of the hydrocarbon tackifier resin is about 80°–110° C. Use of amorphous polymer of propylenebutene containing about 40% butent results in stronger bonds. Suitable commercially available amorphous polymers include Eastman M-5K polymer or Himont AFAX 250 polymer catalytically or thermally degraded to the desired viscosity.

Suitable hydrocarbon tackifying resins can be a hydrocarbon resin such as DAC-B hydrocarbon resin prepared according to the process disclosed in U.S. Pat. No. 3,701,760 as well as other hydrocarbon resins, polyterpenes or synthetic polyterpenes, and the like. One such hydrocarbon tackifying resin is a hydrocarbon resin having a softening point of about 100° C. and available commercially as Eastotac H-100 from Eastman Chemical Products, Inc. Other hydrocarbon tackifying resins can be prepared by the polymerization of monomers consisting primarily of olefins and diolefins and include, for example, the residual by-product monomers, resulting from the manufacture of isoprene.

These hydrocarbon tackifying resins typically exhibit a Ring and Ball softening point of from about 80° C. to about 135° C.; an acid number of from about 0–2, a saponification value of less than about 1; and an iodine value of from about 30 to 100. Examples of such commercially available resins of this type are "Wingtack" 95 and "Wingtack" 115 tackifying resins sold by the Goodyear Tire and Rubber Company, the Sta-Tac and Betaprene A or H resins sold by the Reichold Chemical Corporation. Arkon resins sold by Arakawa Forest Chemical Industires, and Escorez resins sold by Exxon Chemical Co.

Also other suitable resins are the terpene polymers such as the polymeric, resinous materials obtained by polymerization and/or copolymerization of terepene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing at least 20 percent beta-pinene and/or limonene or dipentene (racemic limonene), and the "sulfate turpentine" obtained as a by-product in the sulfate pulping process. Commercially available resins of the terpene type include the Zonarez terpene B-Series and 7000 Series resins from Arizona Chemical Corp. and Nirez resins from Reichhold Chemical Corp. The typical properties reported for the Zonarez Terpene Resins include Ring and Ball softening point of about 55° to 125° C. (ASTM E-28-67), Color of 2 to 3 (Gardner 1963, 50% in Heptane), Acid Number of less than 1 (ASTM D465-59), Saponification Number of less than 1 (ASTM D464-59) and Specific Gravity at 25° C. of 0.96 to 0.99 (ASTM D1963-61).

Suitable rosin tackifiers are the tall oil rosin products having the specified Ring and Ball softening points and acid number. Suitable commercially available products include Acintol R and Polystix 85 rosins.

The low viscosity polyethylene waxes useful in this invention are widely available articles of commerce and can be prepared by known techniques. These waxes are made by direct synthesis or by degradating polyethylene to the desired viscosity. Polyethylene waxes normally have, and should have for the present invention, melting points in the range of 80° to 120° C., and preferably in the range of 105° to 115° C., preferably about 110° C., a penetration hardness at 23° C. of about 3 dmm, and a melt viscosity preferably of about 100 to about 200 cp. at 125° C. Suitable commercially available waxes include Epolene N-14 and Epolene N-11 Waxes, products of Eastman Kodak Company, both of which have densities of about 0.92.

The adhesive compositions of this invention are prepared by blending together the adhesive components in the melt at a temperature of about 160° C. to about 200° C. until a homogeneous mixture is obtained. Various methods of blending materials of this type are known to the art and any method that produces a homogeneous mixture is satisfactory. These components blend easily in the melt and a heated vessel equipped with a stirrer is all that is required. For example, a Cowles stirrer provides effective mixing for preparing these compositions. Solvents such as hexane, heptane, mineral spirits, xylene, toluene, benzene, chlorinated hydrocarbons, etc., are not needed to prepare the compositions of this invention; however, they can be used if desired.

In addition to the adhesive components, it is desirable for the adhesive compositions to contain about 0.1 percent to about 1.5 percent by weight, of one or more antioxidants. Antioxidants that are effective include, for example, tris (di-t-butyl-p-hydroxybenzyl)-trimethylbenzene (Lonox 330), alkylated bisphenol (Naugawhite), zinc dibutyl dithiocarbamate (Butyl Zimate), and 4.4'-methylene bis(2,6-di-tert-butylphenol) (Ethyl 702), tetrakis[methylene(3,5-di-tert-butyl-4-hydroxyhydrocinnamate)methane] (Irganox 1010), lauryl stearyl thiodipropionate (Plastanox 1212), and dilauryl 3,3'-thiodipropionate (Plastanox LTDP), 2,6-di-tert-butyl-p-cresol (BHT) and the like.

Additives such as nucleating agents, pigments, colorants, fillers, solvents, and the like can also be added to the adhesive compositions of the present invention.

The adhesive compositions of this invention, which are essentially 100 percent solids, have a melt viscosity in the range of 100 to 800 centipoise at 177° C. and a RBSP of 80°–120° C.

The following examples are submitted for a better understanding of the invention.

In the examples, the various compositions are melt blended in a beaker at 190° C. by stirring until a homogeneous mixture is obtained. The adhesive is put in a hot-melt applicator for application to a substrate.

Adhesion at various temperatures is determined by applying a ⅛ inch wide bead of adhesive lengthwise to a single sample of label stock, and immediately bringing the desired container, such as a glass jar in contact with moderate hand pressure. Application temperature is 177° C. The label stock is polypropylene coated kraft paper. The bonded specimens are placed in a controlled environment at the desired condition, and allowed to age for 24 hours. Five test specimens are made with each adhesive. The bonds are separated by hand and a determination made as to the type of failure. An adhesive having good bonding capabilities will exhibit fiber tear (FT) of the label stock. An adhesive having poor or no bonding capabilities will exhibit no fiber tear (NFT) of the label, and generally fails adhesively from the container.

This same test can also be used to estimate relative degree of tack by noting the ability of the label to readily affix itself to the container; likewise open times can be compared by simply timing the longest open time at which a bond is obtained.

EXAMPLE 1

| Composition: | 50% | Eastman APP M-5K amorphous polypropylene degraded to ~700 cps at 190° C. |
|---|---|---|
| | 20% | Eastotac H-100 hydrocarbon resin tackifier |
| | 20% | Polystix 85 rosin tackifier (Hercules) |
| | 9.1% | Epolene N-14 Polyethylene wax |
| | 0.7% | DLTDP |
| | 0.2% | hindered phenol antioxidant (Irganox 1010) |

Viscosity: 390 cps at 177° C.
RBSP: 96° C.
Color: Gardner 8

Adhesion: (Polypropylene coated labels to glass):
100% fiber tear at 23° C.
100% fiber tear at 0° C.

-continued

100% fiber tear at 50° C.

Tack: Very good
Open time: 30 sec.
Thermal Stability (viscosity after 100 hrs at 177° C. in air): <10% change in viscosity
Peel Strength (Kraft to Kraft): 600 gms/in width.

EXAMPLE 2 Control

| Composition: | 50% Eastman M-5K Polymer |
| | 49.5% Polystix 85 rosin tackifier |
| | 0.25% BHT |
| | 0.25% Irganox 1010 antioxidant |

Viscosity: 590 cps at 177° C.
Color: Gardner 11

| Adhesion: | ~75% Fiber tear at 23° C. |
| | 100% fiber tear at 0° C. |
| | ~75% fiber tear at 50° C. |

Tack: Very good
Open time and stability not measured.

EXAMPLE 3

| Composition: | 50% Amorphous propylene-butene copolymer, 40% butene, viscosity is 525 cps at 190° C. |
| | 20% Eastotac H-100 hydrocarbon resin tackifier |
| | 20% Polystix 85 rosin tackifier |
| | 9.1% Epolene N-14 polyethylene wax |
| | 0.7% DLTDP |
| | 0.2% Irganox 1010 antioxidant |

Viscosity: 350 cps at 177° C.
Color: Gardner 8
Ring and Ball Softening Point: 96° C.
Tack: good
Adhesion: 100% fiber tear at 0° C., 23° C. and 50° C.

EXAMPLE 4 (Control)

| | A | B |
|---|---|---|
| Eastman M-5K polymer | 50% | 50% |
| Polystix 85 rosin tackifier | 10% | 30% |
| Eastotac H-100 hydrocarbon tackifier | 30% | — |
| Epolene N-14 wax | 9.1% | 19.1% |
| Irganox 1010 antioxidant | 0.2% | 0.2% |
| DLTDP | 0.7% | 0.7% |
| Viscosity at 177° C.: | 680 cps | 490 cps |
| Adhesion: 23° C.: | ~25% fiber tear | ~25% fiber tear |

In the above examples, Example 2 illustrates poor color and adhesion at higher temperatures obtained when the hydrocarbon tackifier and wax are omitted. Example 4, A and B, illustrate loss of fiber tear when the level of rosin tackifier is at the lower limit, or level of polyethylene wax is near the higher limit.

In the examples, Eastman M-5K polymer is an amorphous polypropylene having a melt viscosity of 2400 at 190° C., a density of 0.86 and a SAP No. of 0. It is degraded to a viscosity of about 700 cps at 190° C. Density is about 0.86 and SAP No. is 0.

Eastotac H-100 resin is a hydrocarbon resin tackifier having a RBSP of 100° C., and a melt viscosity of 175 cps t 190° C.

Polystix 85 is a rosin tackifier having an acid number of 156 and a RBSP of 80° C.

Eastman N-14 is a low viscosity polyethylene wax having a melt viscosity of 157 cps at 125° C., a RBSP of 106° C., and a density of 0.92.

The compound designated DLTDP is dilaurylthiodipropionate and BHT is butylated hydroxy toluene.

Himont AFAX 250 polymer is an amorphous polymer having a viscosity of 300 cps at 190° C.

Acintol R rosin is a rosin tackifier having an acid number of 155 and a RBSP of 80° C.

Unless otherwise specified, saponification (SAP) numbers used herein are determined according to ASTM D-1387 for waxes and ASTM D-464 for rosins. Acid numbers are determined according to ASTM D-1386-59. Peel strengths are determined according to ASTM D-903.

Melt viscosities are determined on a Brookfield Model RTV Thermosel Viscometer using a No. 27 spindle. RBSP is determined in °C. using ASTM E-28, and densities are determined using a density gradient tube (ASTM Method D-1505).

Unless otherwise stated, all parts, percentages, ratios, etc., are by weight.

While the invention has been described in detail with particular reference to preferred embodiments thereof, it will be understood that variations and modifications can be effected within the spirit and scope of the invention.

We claim:

1. A hot-melt adhesive composition having a RBSP of about 80°–120° C. and a melt viscosity of about 100–800 cps at 177° C. and which is capable of bonding paper to metal, glass and polyethylene terephthalate comprising
   (a) about 45–55% by weight of an amorphous polymer selected from polypropylene or copoly(propylene-butene) having a propylene content of greater than 50%, said polymer having a melt viscosity of about 100–2000 cps at 190° C., said polymer having a density of about 0.80 to 0.90 and a saponification number of about 0 to 5,
   (b) about 15–25% by weight of a hydrocarbon tackifier resin having a RBSP of about 70°–130° C. and a melt viscosity of about 100 to 2000 cps,
   (c) about 15–25% by weight of a rosin tackifier having an acid number of about 130–170 and a RBSP of about 70°–100° C., and
   (d) about 5–15% by weight of a polyethylene wax having a melt viscosity of about 100 to about 200 cps at 125° C. and a RBSP of about 90°–120° C.

2. A hot-melt adhesive composition according to claim 1 wherein the viscosity of said amorphous polymer is about 200–500 cps at 190° C. and the RBSP of said hydrocarbon tackifier is about 80°–110° C.

3. A hot-melt adhesive composition according to claim 1 wherein the density of said polyethylene wax is below 0.93.

4. A label bonded to a metal, glass or polymeric substrate by means of the adhesive composition of claim 1.

* * * * *